(12) United States Patent
Severance, Jr. et al.

(10) Patent No.: US 9,211,603 B2
(45) Date of Patent: Dec. 15, 2015

(54) PLASMA GOUGING TORCH AND ANGLED NOZZLE THEREFOR

(75) Inventors: Wayne Stanley Severance, Jr., Darlington, SC (US); Joseph Devito, Florence, SC (US)

(73) Assignee: The ESAB Group, Inc., Florence, SC (US)

( * ) Notice: Subject to any disclaimer, the term of this patent is extended or adjusted under 35 U.S.C. 154(b) by 869 days.

(21) Appl. No.: 13/362,737

(22) Filed: Jan. 31, 2012

(65) Prior Publication Data

US 2013/0193118 A1    Aug. 1, 2013

(51) Int. Cl.
*B23K 9/067* (2006.01)
*B23K 10/00* (2006.01)

(52) U.S. Cl.
CPC ...................................... *B23K 10/00* (2013.01)

(58) Field of Classification Search
CPC ............. H05H 1/34; H05H 1/26; B23K 10/00
USPC ............... 219/76.16, 121.36, 121.39, 121.44,
219/121.47, 121.48, 121.5, 121.53, 121.54,
219/11.55, 121.59; 313/231.01, 231.31,
313/231.41
See application file for complete search history.

(56) References Cited

U.S. PATENT DOCUMENTS

| | | |
|---|---|---|
| 2,148,936 A | 2/1939 | Geibig et al. |
| 2,515,302 A | 7/1950 | Hughey |
| 2,534,365 A | 12/1950 | Moore et al. |
| 3,183,337 A | 5/1965 | Winzeler et al. |
| 3,280,295 A | 10/1966 | Mondain-Monval et al. |
| 3,707,615 A | 12/1972 | Rotolico et al. |
| 3,740,522 A | 6/1973 | Muehlberger |
| 3,914,573 A | 10/1975 | Muehlberger |
| 4,423,304 A | 12/1983 | Bass et al. |
| 4,877,937 A * | 10/1989 | Muller ...................... 219/121.59 |
| 4,954,683 A | 9/1990 | Hatch |
| 4,970,364 A | 11/1990 | Muller |
| 5,097,111 A | 3/1992 | Severance, Jr. |
| 5,278,387 A | 1/1994 | Borne |
| 5,837,959 A | 11/1998 | Muehlberger et al. |
| 6,114,649 A | 9/2000 | Delcea |
| 6,215,090 B1 | 4/2001 | Severance, Jr. et al. |
| 6,262,386 B1 | 7/2001 | Fornsel |
| 6,657,152 B2 | 12/2003 | Shimazu |
| 2004/0112875 A1 * | 6/2004 | Yamaguchi et al. ..... 219/121.39 |
| 2009/0255909 A1 | 10/2009 | Duan |

FOREIGN PATENT DOCUMENTS

| | | | |
|---|---|---|---|
| EP | 0 634 887 A1 | 1/1995 | |
| FR | 2 672 459 A1 | 8/1992 | |

* cited by examiner

*Primary Examiner* — Dana Ross
*Assistant Examiner* — Joseph Iskra
(74) *Attorney, Agent, or Firm* — Kacvinsky Daisak Bluni PLLC (57) ABSTRACT

A special-purpose plasma arc torch for gouging grooves in a metal workpiece includes an angled nozzle having a bore made up of a first bore portion and a second bore portion that makes an angle of about 15° to about 75° with the first bore portion. The nozzle includes a proximal portion and a distal portion, the proximal portion being adapted for surrounding an electrode assembly when the nozzle is installed in the torch, the distal portion being adapted such that a part of the distal portion extends beyond a front face of an electrode of the torch. The part of the distal portion extending beyond the front face of the electrode has an exterior shape other than cylindrical or conical, and preferably has a non-axisymmetric shape that makes it suitable for fitting within a deep groove in a workpiece.

22 Claims, 6 Drawing Sheets

PLASMA GOUGING TORCH AND ANGLED NOZZLE THEREFOR

BACKGROUND OF THE INVENTION

The present application relates generally to plasma arc torches used for removing metal from metal workpieces. The application relates more particularly to plasma arc torches that are useful for gouging grooves in metal workpieces.

Gouging operations typically are conducted using a general-purpose plasma arc torch oriented at a relatively shallow angle (e.g., 25° to 40°) to the workpiece surface. With such an arrangement, there is a limit to how deep a gouge can be made before some part of the torch contacts the workpiece. This problem arises for example when backgouging the roots of welds with prepared joints in relatively thick plate.

BRIEF SUMMARY OF THE INVENTION

The present application describes a special-purpose gouging torch that seeks to overcome problems associated with using general-purpose plasma arc torches for gouging. In accordance with one aspect described herein, a plasma arc torch adapted for gouging a metal workpiece comprises a torch body assembly defining a passage for flow of a plasma gas supplied to the torch, a nozzle engaged with the torch body assembly so as to be immovable during torch operation, the nozzle defining a bore that terminates at an exit orifice through which the plasma gas is directed toward a metal workpiece to be gouged, and an electrode assembly mounted to the torch body assembly. The electrode assembly comprises an electrode mounted in an electrode holder, the electrode comprising an emissive insert disposed in a relatively non-emissive body. The electrode assembly extends along an axis of the electrode and terminates at a front face of the electrode at which the emissive insert is positioned for emitting an arc that passes through the bore of the nozzle and attaches to a metal workpiece during a transferred-arc mode of operation of the torch.

The nozzle comprises an angled nozzle in which the bore is constituted by a first bore portion extending along a first bore axis that is generally aligned with the electrode axis, and a second bore portion that is joined with the first bore portion and extends along a second bore axis that makes an angle θ with the first bore axis, the exit orifice of the nozzle being defined by the second bore portion. The angle θ can range from about 15° to about 75°.

In one embodiment, the nozzle includes a proximal portion that surrounds the electrode assembly and a distal portion at least part of which extends beyond the front face of the electrode. The part of the distal portion that extends beyond the front face of the electrode has an exterior shape other than cylindrical or conical. For example, the exterior shape can be a non-axisymmetric shape.

In an embodiment described herein, the part of the distal portion of the nozzle that extends beyond the front face of the electrode has a maximum width and a maximum length, and the maximum width is substantially smaller than the maximum length (the maximum length being measured in or parallel to a plane that contains the first and second bore axes and the maximum width being measured perpendicular to said plane).

The part of the distal portion that extends beyond the front face of the electrode can have a plurality of substantially planar exterior faces. The faces can form a shape that is substantially a truncated pyramid, as one example.

In one embodiment, the proximal and distal portions of the nozzle are formed separately from each other and are releasably connected to each other, such as by a threaded connection.

In another embodiment, the nozzle is an integral one-piece structure.

In some embodiments, a part of the first bore portion in front of the front face of the electrode is substantially cylindrical.

It is also possible for the exit orifice of the nozzle to be in an exterior face of the nozzle that is substantially planar and substantially perpendicular to the second bore axis. This avoids the creation of thin, easily melted edges that would result from drilling the second bore portion into a rounded surface, for instance.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
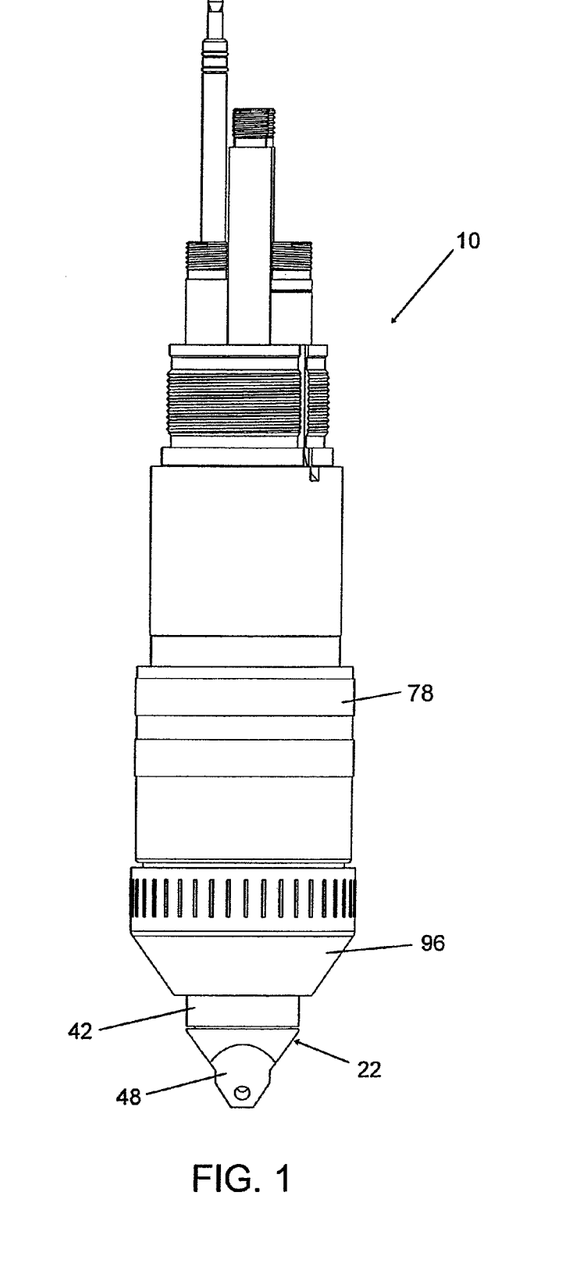
FIG. 1 is a side elevation of a plasma arc gouging torch in accordance with one embodiment of the invention.
Figure 2:
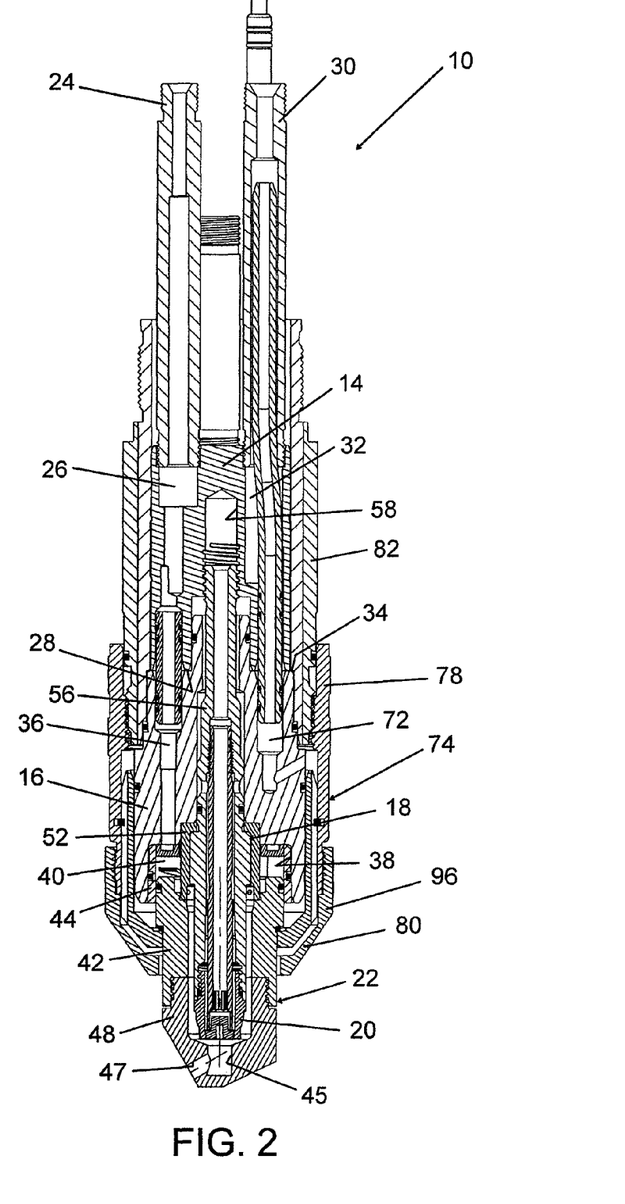
FIG. 2 is an axially sectioned side view of the torch of FIG. 1.
Figure 3:
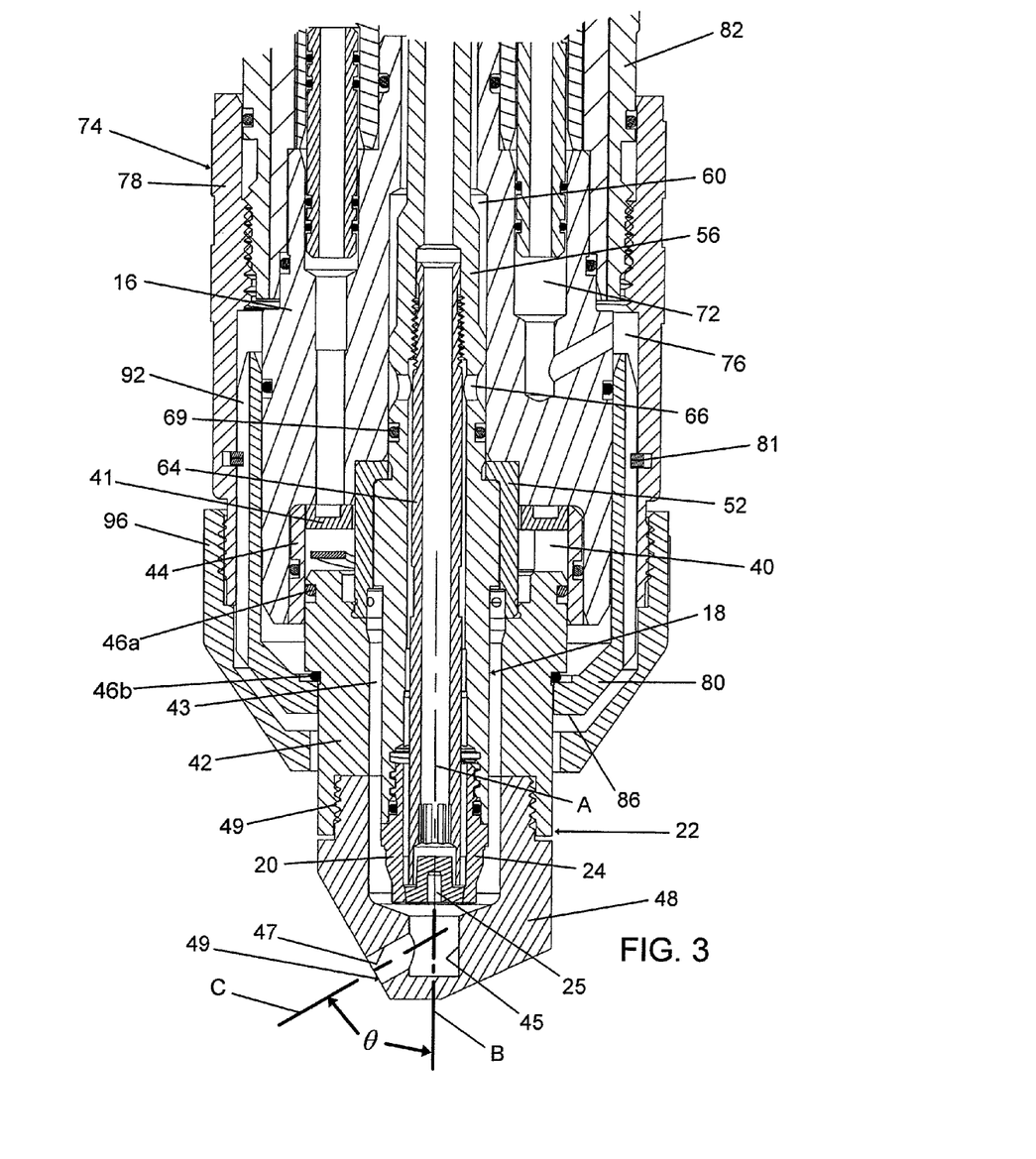
FIG. 3 is a fragmentary axially sectioned side view on an enlarged scale relative to FIG. 2, showing the front portion of the torch including the electrode assembly and angled nozzle.
Figure 4:
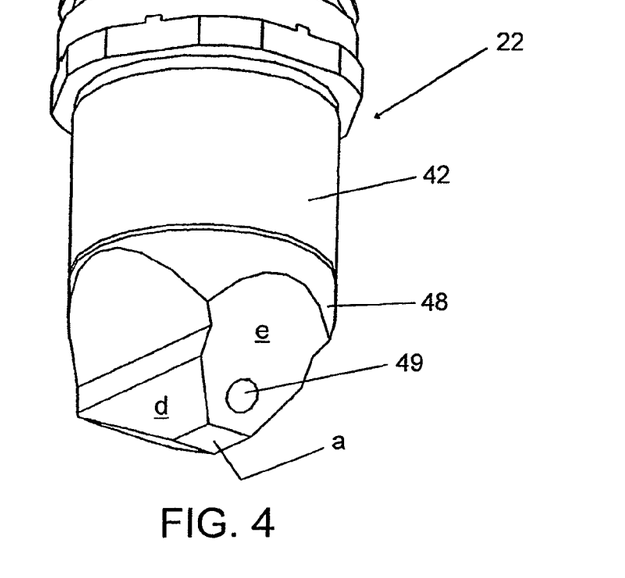
FIG. 4 is a perspective view of an angled nozzle in accordance with an embodiment of the invention.

FIGS. 1-3 depict a plasma arc gouging torch 10 in accordance with one embodiment of the invention. The torch is substantially similar in many respects to the torch described in applicant's U.S. Pat. No. 6,215,090 to Severance, Jr. et al., the entire disclosure of which is hereby incorporated herein by reference. The differences between the present torch and that of the '090 patent relate mainly to the nozzle, which is what the present description primarily focuses on, after first describing some of the major components and features of the torch 10.

Thus, with reference to FIGS. 2 and 3, the torch 10 includes a generally cylindrical main torch body 14 made of a conductive material such as metal, a generally cylindrical lower or front insulator body 16 connected to the main torch body 14, an electrode assembly 18 extending through the main torch body 14 and through the front insulator body 16 and supporting an electrode 20 at a free end of the electrode assembly, and a nozzle 22 connected to the insulator body 16 and located adjacent the electrode 20.

A plasma gas connector tube 24 is connected by screw threads into a plasma gas passage 26 of the main torch body 14 and is secured by silver brazing. The plasma gas passage 26 extends through the main torch body 14 to a lower end face 28 thereof for supplying a plasma gas (sometimes referred to as a cutting gas) to a corresponding passage in the insulator body 16, as further described below. The plasma gas can comprise, for example, air, oxygen, or an argon-hydrogen mixture such as H-35.

A secondary gas connector tube 30 is connected by screw threads into a secondary gas passage 32 of the main torch body 14. The secondary gas passage 32 extends through the main torch body 14 to the lower end face 28 for supplying a secondary gas to a corresponding passage in the insulator body 16. In accordance with one embodiment of the invention, the torch 10 is operated without supplying any secondary gas through the connector tube 30—i.e., only plasma gas is supplied to the torch, via the plasma gas connector tube 24. However, in another embodiment described below in connection with FIGS. 8 and 9, secondary gas is supplied through the secondary gas connector tube 30 for purposes to be described.

The insulator body 16 has an upper end face 34 that abuts the lower end face 28 of the main torch body. A plasma gas passage 36 extends through the insulator body 16 from its upper end face into a cylindrical counterbore 38 in the lower end of the insulator body 16. The counterbore 38, together with the upper end of the nozzle 22, forms a plasma gas chamber 40 from which plasma gas is supplied to the nozzle 22. Plasma gas from a suitable source enters the plasma gas chamber 40 by flowing through the plasma gas connector tube 24, through the plasma gas passage 26 in the main torch body 14, into the plasma gas passage 36 of the insulator body 16 that is aligned with the passage 26, and into the chamber 40 via a series of holes (not visible in the cross-section of FIGS. 2 and 3) in a contact ring 41 (FIG. 3).

The nozzle 22 is formed of a conductive metal (e.g., copper or the like) and includes an upper nozzle member 42 and a lower nozzle tip 48. In the illustrated embodiment, the upper nozzle member 42 and lower nozzle tip 48 are formed separately and are interconnected by screw threads 49. The two-piece construction of the nozzle can allow two or more differently configured nozzle tips to be used with the same upper nozzle member, if that type of interchangeability is desired in a particular application. Alternatively, however, the nozzle 22 can be an integral one-piece structure. In either case, the upper nozzle member 42 has a generally cylindrical upper portion slidingly received within a metal insert sleeve 44 that is inserted into the counterbore 38 of the insulator body 16. An O-ring 46a seals the sliding interconnection between the upper nozzle member 42 and the metal insert sleeve 44. Another O-ring 46b seals the interface between the upper nozzle member 42 and a nozzle retaining cup 80, which is described below.

The plasma gas jet can have a swirl component created, in known manner, by a hollow cylindrical ceramic gas baffle 52 partially disposed in a counterbore recess of the insulator body 16. A lower end of the baffle 52 abuts an annular flange face of the upper nozzle member 42, and an annular space is formed between the baffle 52 and the inner surface of the upper nozzle member 42. The baffle 52 has non-radial holes for directing plasma gas from the chamber 40 into a central passageway 43 of the nozzle 22 with a swirl component of velocity. It should be noted, however, that a swirling plasma gas flow is not essential, and in some cases the plasma gas flow can be made non-swirling, for example by providing radial holes instead of non-radial holes in the baffle 52.

The electrode assembly 18 includes an upper tubular electrode holder 56 that has its upper end connected by screw threads within a blind axial bore 58 in the main torch body 14. The upper electrode holder 56 extends into an axial bore 60 formed through the insulator body 16, and passes through a central passage in the ceramic gas baffle 52. The lower end of the electrode holder 56 is internally screw-threaded. The electrode 20 is connected via the screw threads to the holder 56. The electrode holder also includes internal screw threads for threadingly attaching a lower coolant tube 64 that is coaxially disposed within the central passage of the electrode holder and supplies coolant to the electrode 20.

The electrode 20 may be of the type described in U.S. Pat. No. 5,097,111, assigned to the assignee of the present application and incorporated herein by reference. The electrode 20 as illustrated in the present drawings comprises a cup-shaped body 24 whose open upper end is threaded by screw threads into the holder 56 at its lower end and whose capped lower end is closely adjacent the lower end of the lower coolant tube 64. The body 24 is formed of a relatively non-emissive metal such as copper or an alloy of copper. An emissive insert 25 is disposed in a cavity in the front wall of the body 24. Alternatively, other types of electrodes can be used, such as tungsten pencil electrodes. Whatever specific type of electrode is employed, an arc is emitted from the front face of the electrode and attaches to the workpiece when a sufficient voltage differential is created between the electrode and the workpiece.

A coolant circulating space exists between the inner wall of the electrode 20 and the outer wall of the coolant tube 64, and between the outer wall of the coolant tube 64 and the inner wall of the electrode holder 56. The electrode holder 56 includes holes 66 for supplying coolant from the space within the electrode holder to a space between the electrode holder and the inner wall of the axial bore 60 in the insulator body 16. A seal 69 located between the holes 66 and the lower end portion of the holder 56 seals against the inner wall of the bore 60 to prevent coolant from flowing past the seal 69 toward the baffle 52.

A nozzle retaining cup assembly 74 surrounds the insulator body 16. The nozzle retaining cup assembly 74 includes a nozzle retaining cup holder 78 and a nozzle retaining cup 80 that is secured within the holder 78 by a snap ring 81 or the like. The nozzle retaining cup holder 78 is a generally cylindrical sleeve preferably formed of metal, and is threaded over the lower end of a torch outer housing 82 that surrounds the main torch body 14. The nozzle retaining cup 80 preferably is formed of plastic and has a generally cylindrical upper portion that is secured within the cup holder 78 by the snap ring 81 and a generally frustoconical lower portion that extends toward the front end of the torch and includes an inwardly directed flange 86. The flange 86 confronts a shoulder on the upper nozzle member 42 and contacts an O-ring disposed therebetween. Thus, in threading the nozzle retaining cup assembly 74 onto the outer housing 82, the nozzle retaining cup 80 draws the nozzle 22 upward into the metal insert sleeve 44 in the insulator body 16 and compresses the O-ring to seal the interface between the cup 80 and the nozzle.

The cup holder 78 surrounds the insulator body 16 to create a generally annular secondary gas chamber 76 (FIG. 3) between the insulator body 16 and cup holder 78. A secondary gas can be supplied through the secondary gas connector tube 30, into a secondary gas passage 72 of the insulator body 16, and from there into the secondary gas chamber 76. The nozzle retaining cup 80 fits loosely within the cup holder 78, and includes longitudinal grooves 92 in its outer surface for the passage of a gas from the chamber 76 toward the front end of the torch. Alternatively or additionally, grooves (not shown) may be formed in the inner surface of the cup holder 78. A heat shield 96 is threaded onto the lower end of the cup holder 78 and serves to protect the plastic nozzle retaining cup 80 from heat generated during a gouging operation. A secondary gas flow path thus extends from the chamber 76 through the longitudinal grooves 92 in the retaining cup 80, and between the heat shield 96 and the retaining cup 80 and upper nozzle member 42. However, as noted, in the current embodiment a secondary gas is not used for gouging. It may be useful, nevertheless, to flow a secondary gas (e.g., an inert gas) through this secondary gas flow path in order to help keep the front end of the torch cooler during operation. As shown in FIGS. 2 and 3, a small annular opening exists between the heat shield 96 and the nozzle 22 through which the secondary gas would be discharged.

With primary reference to FIGS. 3-7, the nozzle 22 is now described. The nozzle 22 comprises an angled nozzle for directing the flow of plasma gas and the electrical arc emitted from the emissive insert 25 of the electrode along a direction that is non-parallel to an axis A of the electrode assembly 18. Thus, the bore that extends through the nozzle 22 is constituted by a first bore portion 45 extending along a first bore axis B that is generally aligned with the electrode axis A, and a second bore portion 47 that is joined with the first bore portion 45 and extends along a second bore axis C that makes an angle θ with the first bore axis. The angle θ can range from about 15° to about 75°. An exit orifice 49 (FIG. 4) of the nozzle is defined by the second bore portion 47.

The angled nozzle 22 allows the torch to be oriented at a steep angle relative to the workpiece surface so that no part of the torch contacts the workpiece during a gouging operation. For example, the electrode axis A can make an angle of 90° with the workpiece surface and the angle θ can be 65°, resulting in the plasma arc being inclined at 25° relative to the workpiece surface. Other combinations of torch orientation and the angle θ could also achieve the same 25° inclination, or a different angle of inclination, depending on the needs of a particular gouging operation.

Figure 5:
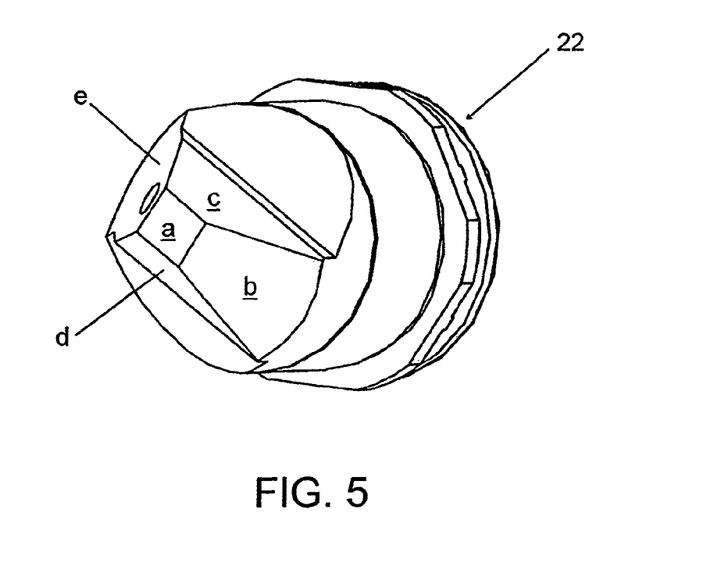
FIG. 5 is a further perspective view of the angled nozzle of FIG. 4.
Figure 6:
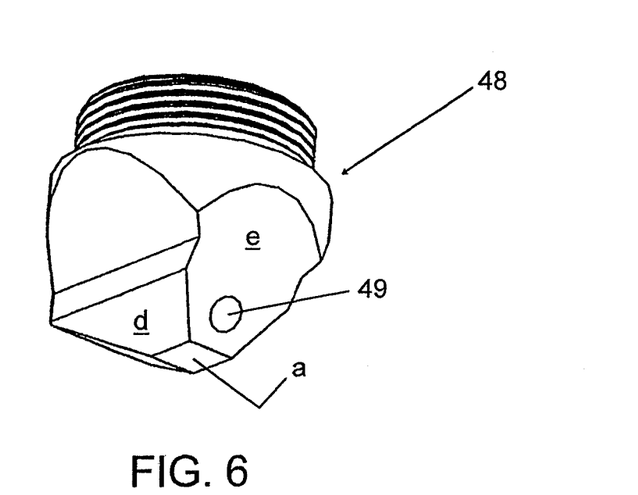
FIG. 6 is a perspective view of a front portion of the angled nozzle of FIGS. 4 and 5, detached from the rear portion of the nozzle.
Figure 7:
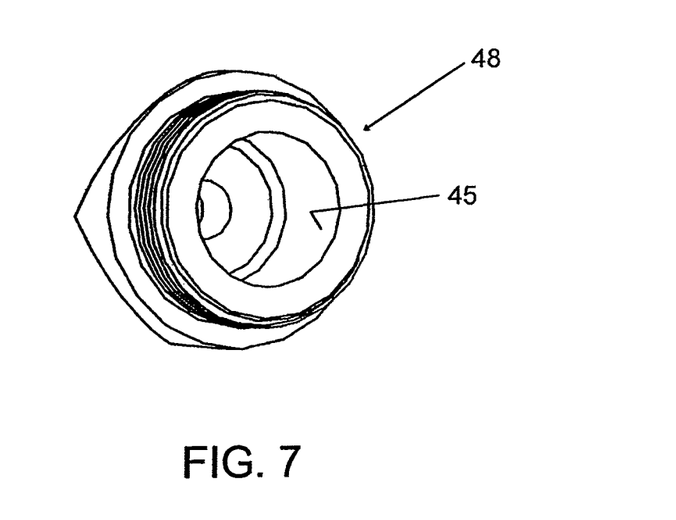
FIG. 7 is another perspective view of the front portion of the nozzle from a rear side thereof.

The exterior configuration of the nozzle 22 also facilitates gouging of deep grooves in a workpiece. As shown in FIG. 3, the nozzle 22 comprises a proximal portion that surrounds the electrode assembly 18 and a distal portion at least part of which extends beyond the front face of the electrode 20. The proximal and distal portions of the nozzle generally correspond to the upper nozzle member 42 and nozzle tip 48. The part of the distal portion that extends beyond the front face of the electrode 20 has a shape other than cylindrical or conical. In the illustrated embodiment the shape is non-axisymmetric. For example, the non-axisymmetric shape can be a truncated pyramid defining a plurality of flat exterior faces a, b, c, d, and e as shown in FIG. 5. The face a is the end face of the nozzle and can be substantially perpendicular to the electrode axis A. The face b is a trailing face of the nozzle with respect to the direction of torch movement during a gouging operation, and is inclined at a relatively small angle relative to the face a. The faces c and d are side faces that are laterally inclined relative to the face a and converge toward each other in the downward direction. The face e is a leading face of the nozzle with respect to the direction of torch movement and is inclined at a relatively steep angle relative to the face a. The nozzle exit orifice 49 is in the face e. The second bore axis C preferably is normal or substantially normal to the face e, which helps avoid the creation of thin (and thus easily melted) edges that would otherwise result if the second bore portion 47 were machined into a rounded (e.g., conical) surface.

The part of the distal portion of the nozzle 22 that extends beyond the front face of the electrode 20 has a maximum width and a maximum length, the maximum length being measured in or parallel to a plane that contains the first and second bore axes B and C (thus, in the plane of FIG. 3) and the maximum width being measured perpendicular to that plane (thus, in the plane of FIG. 2). The maximum width is substantially smaller than the maximum length, as can be seen by comparing FIGS. 2 and 3. The relatively small width of the distal portion of the nozzle allows the distal portion to fit within a deep groove without touching the workpiece. Additionally, the downwardly tapering shape of the distal portion further facilitates gouging of deep grooves.

In the illustrated embodiment, the first bore portion 45 has a stepped configuration, having a larger-diameter portion at the top of the nozzle tip 48, stepping down to a smaller-diameter portion at the lower end of the nozzle tip 48. The part of the first bore portion 45 that is in front of the front face of the electrode 20 can be substantially cylindrical. This cylindrical bore in front of the electrode is believed to help the arc emit cleanly at 90° from the face of the electrode and thus reduce the tendency of the electrode to wear unevenly. The second bore portion 47 is machined at the angle θ relative to the first bore portion 45 so as to intersect the first bore portion. It is not a requirement that either bore portion 45 or 47 be circular in cross-section. Both circular and non-circular cross-sections are possible in accordance with the invention.

Figures 8, 9:
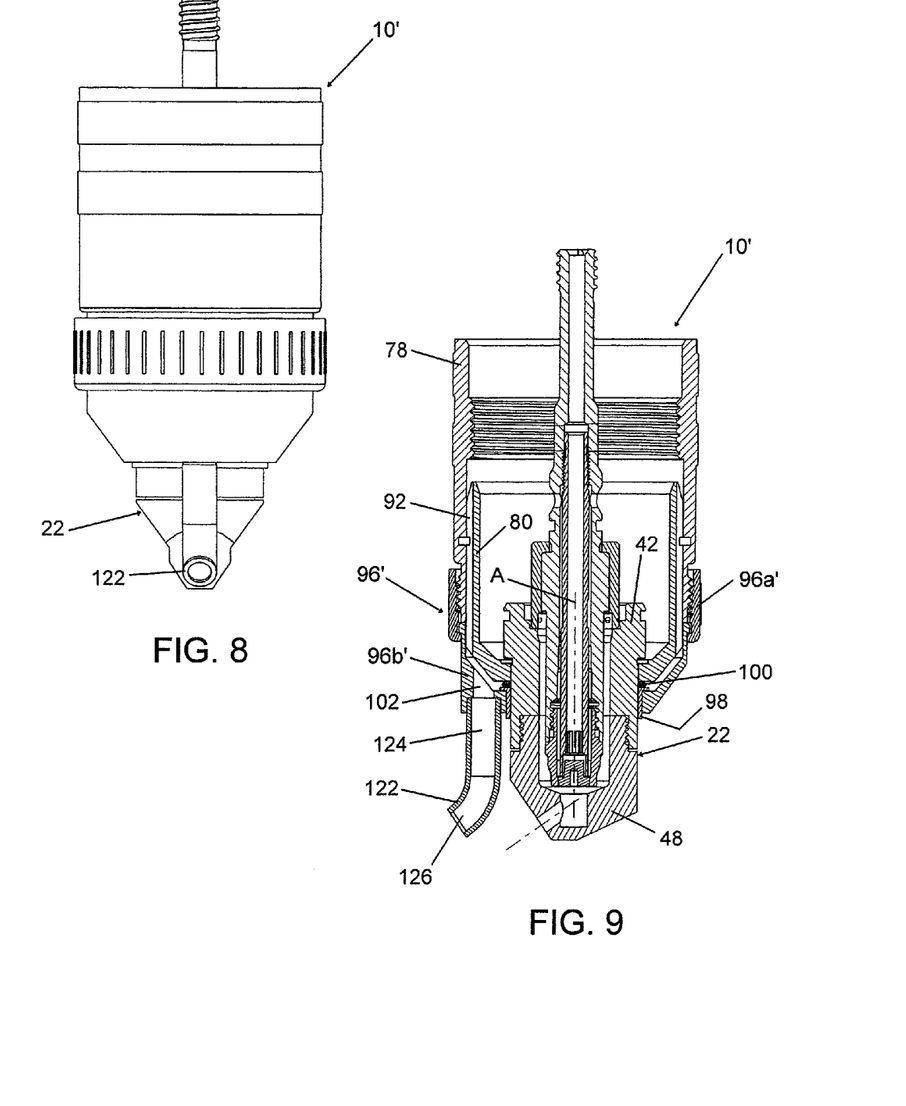
FIG. 8 is a side elevation of a torch in accordance with another embodiment of the invention.
FIG. 9 is a sectioned side view of the torch of FIG. 8.

In accordance with another embodiment of the invention illustrated in FIGS. 8 and 9, a plasma arc gouging torch 10' includes a provision for using a secondary gas in addition to the plasma gas supplied to the nozzle 22. As in the prior embodiment, the nozzle retaining cup 80 fits loosely within the cup holder 78, and includes longitudinal grooves 92 in its outer surface for the passage of a gas from the chamber defined between the holder 78 and the insulator body (not shown, but see similar chamber 76 in FIG. 3) toward the front end of the torch. Alternatively or additionally, grooves (not shown) may be formed in the inner surface of the cup holder 78. A gas flow path thus extends from the chamber through the longitudinal grooves 92 in the retaining cup 80, and between a heat shield 96' and the retaining cup 80.

In this embodiment, the heat shield 96' is modified relative to that of the previously described embodiment so that it accommodates connection of a secondary nozzle 122 to which a secondary gas is supplied via the aforementioned gas flow path. In the illustrated embodiment of FIG. 9, the heat shield 96' is a two-part structure comprising an upper part 96a' that is screwed onto the externally threaded cup holder 78, and a lower part 96b' that is retained by the upper part 96a' via radially overlapping flanges or shoulders of the two parts. A sleeve 98 surrounds the upper nozzle member 42 just below the retaining cup 80. As the heat shield 96' is screwed onto the cup holder 78, the lower part 96b' of the heat shield is drawn upwardly against a flange of the sleeve 98 so as to also urge the sleeve 98 upwardly, thereby compressing an O-ring 100 between the flange of the sleeve 98 and a flange of the retaining cup 80, thus sealing the secondary gas passageway's interface with the nozzle 22.

A chamber 102 is defined between the lower part 96b' of the heat shield and the retaining cup 80. A secondary gas fed into the connector tube 30 (see FIG. 2) passes into the chamber (see chamber 76 in FIG. 3), then along the flow path formed by the grooves 92 in the nozzle retaining cup 80 into the chamber 102. The lower part 96b' of the heat shield 96' connects to the secondary nozzle 122 such that the secondary gas is fed from the chamber 102 through the secondary nozzle. The secondary nozzle 122 comprises a tube of suitable cross-sectional shape (a circular shape is illustrated, but other shapes can be used) having a "dogleg" or curved configuration so that secondary gas enters the secondary nozzle along a direction generally parallel to the electrode axis A and is then turned through an angle and is discharged along a direction substantially non-parallel to the axis A, for example in generally the same direction as the primary (plasma) gas is discharged from the primary nozzle 22. Thus, similar to the primary nozzle 22, the secondary nozzle 122 can be regarded as having a first secondary bore portion 124 generally parallel to the electrode axis A and a second secondary bore portion 126 at a non-zero angle with respect to the first secondary bore portion. The secondary nozzle is positioned so that it leads the primary nozzle 22 with respect to the direction of torch movement during a gouging operation.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A plasma arc torch adapted for gouging a metal workpiece, comprising:
    a torch body assembly defining a passage for flow of a plasma gas supplied to the torch;
    a nozzle engaged with the torch body assembly so as to be immovable during torch operation, the nozzle defining a bore that terminates at an exit orifice through which the plasma gas is directed toward a metal workpiece to be gouged; and
    an electrode assembly, which includes an electrode, mounted to the torch body assembly, the electrode assembly defining an electrode axis, the electrode assembly extending along the electrode axis and terminating at a front face of the electrode, the electrode being operable to emit from the front face an arc that passes through the bore of the nozzle and attaches to a metal workpiece during a transferred-arc mode of operation of the torch;
    wherein the nozzle comprises an angled nozzle in which the bore is constituted by a first bore portion extending along a first bore axis that is parallel with the electrode axis and a second bore portion that is joined with the first bore portion and extends along a second bore axis that makes a non-zero angle θ with the first bore axis and the electrode axis, the arc extending along the first bore axis and along the second bore axis when emitted from the electrode, the exit orifice of the nozzle being defined by the second bore portion.

2. The plasma arc torch of claim 1 wherein the angle θ ranges from about 15° to about 75°.

3. The plasma arc torch of claim 1, wherein the nozzle includes a proximal portion that surrounds the electrode assembly and a distal portion at least part of which extends beyond a front face of the electrode, and wherein the part of the distal portion that extends beyond the front face of the electrode has an exterior shape other than cylindrical or conical.

4. The plasma arc torch of claim 3, wherein the part of the distal portion that extends beyond the front face of the electrode has a non-axisymmetric exterior shape.

5. The plasma arc torch of claim 4, wherein the part of the distal portion that extends beyond the front face of the electrode has a maximum width and a maximum length, and the maximum width is substantially smaller than the maximum length, the maximum length being measured in or parallel to a plane that contains the first and second bore axes and the maximum width being measured perpendicular to said plane.

6. The plasma arc torch of claim 4, wherein the part of the distal portion that extends beyond the front face of the electrode has a plurality of substantially planar exterior faces.

7. The plasma arc torch of claim 6, wherein the substantially planar exterior faces form a shape that is substantially a truncated pyramid.

8. The plasma arc torch of claim 3, wherein the proximal and distal portions of the nozzle are formed separately from each other and are releasably connected to each other.

9. The plasma arc torch of claim 1, wherein the nozzle is an integral one-piece structure.

10. The plasma arc torch of claim 1, wherein a part of the first bore portion in front of the front face of the electrode is substantially cylindrical.

11. The plasma arc torch of claim 1, wherein the exit orifice of the nozzle is in an exterior face of the nozzle that is substantially planar and substantially perpendicular to the second bore axis.

12. The plasma arc torch of claim 1, wherein the electrode assembly includes an electrode holder to which the electrode is mounted, and wherein the electrode comprises an emissive insert disposed in a relatively non-emissive body, the emissive insert being positioned at the front face of the electrode.

13. A nozzle for a plasma arc gouging torch, comprising:
    a body of conductive metal defining a bore that terminates at an exit orifice through which a plasma gas is directed toward a metal workpiece to be gouged, wherein the bore is constituted by a first bore portion extending along a first bore axis and a second bore portion that is joined with the first bore portion and extends along a second bore axis that makes a non-zero angle θ with the first bore axis, the exit orifice of the nozzle being defined by the second bore portion;
    wherein the nozzle includes a proximal portion and a distal portion, the proximal portion being adapted for surrounding an electrode assembly when the nozzle is installed in a plasma arc gouging torch, the distal portion being adapted such that a part of the distal portion extends beyond a front face of an electrode of the torch, the electrode being parallel with the first bore axis and operable to emit from the front face an arc that passes through the bore of the nozzle and attaches to a metal workpiece during a transferred-arc mode of operation of the torch, the arc extending along the first bore axis and along the second bore axis when emitted from the electrode, and wherein said part of the distal portion has an exterior shape other than cylindrical or conical.

14. The nozzle of claim 13, wherein the angle θ ranges from about 15° to about 75°.

15. The nozzle of claim 13, wherein said part of the distal portion has a non-axisymmetric exterior shape.

16. The nozzle of claim 15, wherein said part of the distal portion has a maximum width and a maximum length, and the maximum width is substantially smaller than the maximum length, the maximum length being measured in or parallel to a plane that contains the first and second bore axes and the maximum width being measured perpendicular to said plane.

17. The nozzle of claim 15, wherein said part of the distal portion has a plurality of substantially planar exterior faces.

18. The nozzle of claim 17, wherein the substantially planar exterior faces form a shape that is substantially a truncated pyramid.

19. The nozzle of claim 13, wherein the proximal and distal portions of the nozzle are formed separately from each other and are releasably connected to each other.

20. The nozzle of claim 13, wherein the nozzle is an integral one-piece structure.

21. The nozzle of claim 13, wherein a part of the first bore portion, which is in front of the front face of the electrode when the nozzle is installed in the torch, is substantially cylindrical.

22. The nozzle of claim 13, wherein the exit orifice of the nozzle is in an exterior face of the nozzle that is substantially planar and substantially perpendicular to the second bore axis.

\* \* \* \* \*